United States Patent [19]

Fons

[11] Patent Number: 4,476,716

[45] Date of Patent: Oct. 16, 1984

[54] METHODS FOR LOCATING OIL OR GAS DEPOSITS EMPLOYING TEMPERATURE AND/OR GEOTHERMAL GRADIENT MEASUREMENTS

[76] Inventor: Lloyd C. Fons, 14410 Cindywood Dr., Houston, Tex. 77079

[21] Appl. No.: 498,279

[22] Filed: May 26, 1983

[51] Int. Cl.$^3$ .............................................. E21B 47/06
[52] U.S. Cl. ...................................... 73/154; 374/112; 374/136
[58] Field of Search ................... 374/112, 136; 73/154

[56] References Cited

U.S. PATENT DOCUMENTS

| | | | |
|---|---|---|---|
| 3,410,136 | 11/1968 | Johns et al. | 374/136 |
| 3,745,822 | 7/1973 | Pierce et al. | 374/136 |
| 3,892,128 | 7/1975 | Smith, Jr. | 73/154 |
| 4,120,199 | 10/1978 | Mufti | 73/154 |

*Primary Examiner*—Howard A. Birmiel
*Attorney, Agent, or Firm*—Browning, Bushman, Zamecki & Anderson

[57] ABSTRACT

A method for predicting the likelihood of encountering oil or gas deposits below a location. A temperature at a known depth at the location is compared to a temperature representative of the average temperature for that depth within the geographical area in which the location is situated. If the temperature at the location is less than the average temperature, it is likely that an oil or gas deposit is present at the location at a depth below the known depth. If the temperature at the location is greater than the average temperature, then it is likely that no oil or gas deposit is present at the location at a depth below the known depth. Alternatively, geothermal gradients are employed in a similar method for predicting the likelihood of encountering oil or gas deposits below a location.

20 Claims, No Drawings

METHODS FOR LOCATING OIL OR GAS DEPOSITS EMPLOYING TEMPERATURE AND/OR GEOTHERMAL GRADIENT MEASUREMENTS

BACKGROUND OF THE INVENTION

1. Field of the Invention

The present invention relates to methods of exploring for oil or gas deposits. Particularly, the present invention relates to methods for predicting the likelihood of finding oil or gas deposits at unexplored depths by utilizing temperature and geothermal gradient information available from shallower depths. More particularly, the present invention relates to methods of predicting the presence of oil or gas deposits by comparing the temperatures and/or the geothermal gradients at one location with average values of temperatures and geothermal gradients within the geographical area around the location.

2. Description of the Background

Oil and gas deposits are commonly found in sedimentary earth formations from about the surface of the earth to depths of about 25,000 feet or more. Within these sedimentary formations, it is known that the temperature of the earth steadily increases with depth from a point near the surface. The surface of the earth, and very near-surface, are affected by seasonal fluctuations in atmospheric and benthic temperatures. Consequently, at the near-surface limit to which seasonal temperature changes reach, the temperature of the earth is in many cases constant at about the value of the yearly average surface temperature. From this near surface limit point, the temperature of the earth begins its steady increase proportional to depth. As a result of this temperature increase with depth, curves of temperature vs. depth may be constructed, which indicate a surface temperature and a temperature at any depth within the interval over which the curve is constructed. The "surface temperature" on such a temperature vs. depth curve is generally about equivalent to the yearly average surface temperature. Also, a change in temperature with change in depth can be measured and is called the "geothermal gradient" which is expressed in units of (°F./100 ft.) or (°C./100 m). The geothermal gradient is equivalent to the mathematical slope of the temperature vs. depth curve.

Data showing the temperature of the earth at various depths has been obtained for a very large number of locations, both throughout the United States and the world. For example, when electric-logs or nuclear-logs are obtained on wells, the bottom-hole depth and temperature are measured and recorded upon the well-log record. Much of this temperature-depth data from well-logs is available to the public from the various state agencies which are responsible for oil and gas drilling. In the state of Texas, such information is available from the Railroad Commission of the State of Texas.

Geological surveys often include surface and near-surface earth temperature data. Meteorological surveys include average annual atmospheric temperature data; marine surveys include benthic temperature data. Results of such surveys are publically available from such sources as the U.S. Geological Survey and the National Atmospheric and Ocean Services.

In many geographical areas, local geologists and geophysicists have adopted values for surface temperature and for geothermal gradient which are representative of the average of these values within the geographical area. These adopted values have been arrived at by empirical means and are not notably accurate when applied to a specific location within the geographical area. However, such representative values of surface temperature and geothermal gradient are well known to those exploring for oil and gas in the geographical areas, and such representative values are useful in circumstances where no better temperature-depth data is available.

In most instances, the average geothermal gradient for a geographical area can be represented by a single value for depth ranges of many thousands of feet. The average temperature vs. depth curve for a geographical area can be represented as a straight line passing through the scattered or actual temperature vs. depth measurements. However, in some geographical areas, the average geothermal gradient cannot be accurately represented by one constant value over the depth interval of interest. In such cases, the average geothermal gradient is assigned one value over one depth interval, and a second value over a second depth interval. One particular circumstance where the average geothermal gradient is given different values over different depth intervals is where a geopressurized zone is found at some depth below the surface. Earth formations within geopressurized zones are thought to be subject to pressures and earth stresses which increase heat conduction from below, consequently increasing temperatures within these zones at rates much greater than rates of temperature increase experienced at shallower depths. Thus, in geographical areas where geopressurized zones are thought to exist, the geothermal gradient is given a first, lower value over the interval from the surface to the top of the geopressurized zone, and a second, higher value over the depth interval below the top of the geopressurized zone.

Those skilled in exploring for oil and gas recognize that the values which represent the average values of surface temperature, geothermal gradients and temperature vs. depth information for a particular geographical area will not be accurate when applied to a specific location. It is well known that measured values of temperature and geothermal gradient at specific locations can vary substantially from the average values developed for the surrounding geographical area.

Wells at some locations may have anomalously high temperatures at certain depths, compared to the average for wells in the surrounding geographical area. Wells having anomalously high temperatures at substantial depths often also have anomalously high pressures at such depths, corresponding with the concept of geopressurized zones. In addition to geopressure effects, anomalously high temperatures in wells often result from other causes, e.g. the presence of thermally conductive intrusives such as salt domes. Proposals have been made that anomalously high temperatures may be encountered around the periphery of oil deposits, forming a "halo" of high temperatures outlining the oil deposit. Studies of temperatures around known oil fields have been made for the purpose of demonstrating the presence of these halos of high temperature. The published results of these studies show mixed results, with halos of high temperatures delineating some oil-fields but not others.

Wells may also have anomalously low temperatures at some depths, compared to average temperatures for the surrounding geographical areas.

In situations where direct measurement of temperature and depth in a well are made, e.g. in well logging operations, two sources of error are predominant: the temperature measured is inaccurate because the thermometer is not given time to equilibrate before being moved; the well may have horizontal deviations such that the measured depth is greater than the actual depth. Both these sources of error tend to produce measured temperature values which are lower than the true temperature values.

Those skilled in the art of exploring for oil and gas know that heat is transmitted at different rates through different earth formations. It is also known that the geothermal gradient in a given well varies according to the type of earth formation being traversed.

We have observed that temperatures and geothermal gradients for the same depth intervals vary significantly from well to well, even within small geographical areas. Further, such actual values of temperatures and geothermal gradients vary significantly from the values which represent the averages for the geographical area. From these observed variations in temperature and geothermal gradient from well to well, and even within the same well, we have discovered improved methods for predicting the likelihood that oil or gas deposits are present below selected locations.

SUMMARY OF THE INVENTION

Now according to the present invention, we have discovered a method for predicting the likelihood that oil or gas deposits are present at unexplored depths below a selected location. The discovery of the present invention is that temperatures at a first location vertically above an oil or gas deposit tend to be lower than temperatures at corresponding depths at other locations, in the same geographical area with the first location, where oil or gas deposits do not exist.

In one embodiment, the method of the present invention comprises:

selecting a location within a geographical area;

determining an actual temperature ($T_a$) at a known depth beneath said location;

determining a temperature ($T_r$) representative of the average temperature for said known depth in the geographical area;

determining a temperature difference ($\Delta T$) according to the relationship $\Delta T = T_a - T_r$; and predicting that oil or gas deposits are likely to be present below said depth at said location for negative values of $\Delta T$ or predicting that oil or gas deposits are unlikely to be present below said known depth at said location for positive values of $\Delta T$.

In a second embodiment, the method of the present invention comprises:

selecting a location within a geographical area;

determining the actual geothermal gradient ($G_a$) over a selected depth interval beneath said location;

determining a geothermal gradient ($G_r$) which is representative of the average geothermal gradient for the geographical area;

determining a geothermal gradient difference ($\Delta G$) according to the relationship $\Delta G = G_a - G_r$; and predicting that oil or gas deposits are likely to be present at said location at a depth below said known interval for negative values of $\Delta G$.

In a third embodiment, the present invention comprises a method for predicting the presence of an oil or gas deposit at a location, which method comprises:

measuring the value of the geothermal gradient for two or more depth intervals beneath said location;

predicting that an oil or gas deposit is present at a depth below the bottom of said second interval for instances where the value of the geothermal gradient decreases from a first, shallower interval to a second, deeper interval; and predicting that an oil or gas deposit is present at a depth below the bottom of said second interval and above the bottom of a third interval for instances where the value of the geothermal gradient decreases from the first interval to the second interval, and then the geothermal gradient increases in value from said second interval to a third, yet deeper interval.

DETAILED DESCRIPTION OF THE INVENTION

In exploratory drilling, the success rate for finding commercial deposits of oil and gas is low. About one producing well is completed for every ten exploratory wells drilled. The present invention is useful for providing predictions of whether oil or gas deposits exist at unexplored, undrilled depths beneath a location. Utilization of the methods of the present invention can improve the success ratio in finding oil and gas deposits, and consequently can substantially reduce the cost of finding oil and gas reserves. The accuracy of the method of the present invention in predicting whether oil or gas deposits are present is highly dependent upon the quality and accuracy of the temperature-depth data available. In cases where the predictions of the present invention approach 100% accuracy, the cost of drilling for oil and gas reserves can be reduced to about 1/10 of the present cost.

We have discovered that actual temperatures ($T_a$) in the interval vertically above an oil or gas deposit are significantly lower than average, representative temperatures ($T_r$) at corresponding depths in the same geographical area, but where oil or gas deposits do not occur. Thus, the difference in temperature ($\Delta T$) between locations where oil and gas deposits do occur, and average temperatures for the area are of sufficient magnitude that the temperature difference is useful for predicting whether oil or gas deposits are likely to be present at any particular location. The magnitude of the observable decrease in temperature above an oil or gas deposit appears to be directly proportional to the size and thickness of the oil or gas deposit and appears to be inversely proportional to the distance to the deposit.

The magnitude of the difference in temperature between locations where oil or gas deposits do and do not occur increases from the surface to the depth just above where the oil or gas deposit is located. Thus, at the surface the temperature above an oil or gas deposit will be only slightly (but measurably) less than the average surface temperature for the geographical area. However, at a depth just above the oil or gas deposit, the temperature is much lower, often in the range of 40° F. to 60° F. lower, than the average temperatures for such depths.

Temperatures across oil or gas deposits increase rapidly, so that temperatures at the bottom of oil or gas deposits are about equal to, or slightly higher than the average temperatures at equivalent depths within the geographical area.

In general, the accuracy of predictions made using the methods of the present invention are dependent upon the accuracy of temperatures vs. depth data available at the locations under study and for the surrounding geographical area. For areas where available temperature vs. depth data is questionable, the accuracy of predictions made using methods of the present invention for identifying locations of oil or gas deposits can be increased by considering only those locations having the greatest difference in temperatures from the average temperatures for the surrounding area. For areas where temperature vs. depth data is more accurate, predictions that oil or gas deposits are present may be based upon temperature differences of smaller magnitude. Where surface and ambient temperatures are very accurately determined, temperature differences in the range of 1° F. may be used to predict the presence of oil or gas deposits at selected locations.

The magnitude of the value of temperature differences appears to be affected by the thickness and areal extent of the oil or gas deposits. The temperature above a larger, thicker oil or gas deposit appears to be lower than the temperature, at an equivalent depth, above a thinner, smaller oil or gas deposit. Thus, temperature differences of larger magnitude may indicate the presence of larger oil or gas deposits.

Related to our discovery that temperatures are lower above oil and gas deposits is our discovery that the geothermal gradient (°F./100 ft.) in the interval above an oil or gas deposit is lower than the average geothermal gradient for the geographical area. As with the temperature differences, the difference in value of the geothermal gradient is sufficient for predicting the likelihood that oil or gas deposits are present beneath selected locations.

According to the present invention, temperatures or geothermal gradients of lower value than the average values for the geographical area are indicative of locations where oil or gas deposits are likely to be found. Temperatures and geothermal gradients of higher than average value are indicative of locations where oil or gas deposits probably do not exist. Temperatures and geothermal gradients of about average value for the geographical area are difficult to interpret, considering the accuracy of available temperature vs. depth data. However, considering that temperatures are lower above larger deposits of oil or gas, it may be predicted that temperatures and geothermal gradients of about average value do not indicate the presence of significant or commercial oil or gas deposits.

Temperatures increase rapidly across an oil or gas deposit. The geothermal gradient across an oil or gas deposit has a large value. When only one oil or gas deposit is present at a location, temperatures are lower above the oil or gas deposit but about average below the deposit. Thus, one indication that an oil or gas deposit has been traversed in a well is an abnormally high geothermal gradient.

Special consideration must be given to locations where more than one oil or gas deposit occur in a single well. While the temperature is lower above a first, shallower deposit, and the temperature increases rapidly across the first deposit, the temperature will not increase to the average value because of the presence of the second, deeper deposit. Where a second deposit lies below a first deposit, the temperature above the first deposit will be lower than average and the temperature between the first and second deposits will also be lower than the average for the depth. Thus, although there are sharp temperature increases across oil and gas deposits, the temperature below a first deposit will not increase to the average for the depth when the first oil or gas deposit is located above a second, deeper deposit.

While not wishing to be bound by any theory of why temperatures vertically above oil and gas deposits are lower than average temperatures at corresponding depths for the geographical area, we note that the thermal conductivities of petroleum oil and natural gas are of substantially lower values than the thermal conductivities of materials (limestone, sandstone, dolomite, shale, clay, sand, salt, water, brine, anhydrite and the like) commonly encountered in oil and gas wells. Thus, an oil or gas deposit may form an insulating blanket or layer which would retard the flow of heat from the interior of the earth to the surface. Accordingly, the temperature above an oil or gas deposit might be expected to be lower than the temperature at a comparable depth where no insulating layer of oil or gas is found. Such an insulating effect may form the basis for the phenomenon we have observed.

These observed phenomena are used in the method of the present invention in exploring for oil and gas deposits at unexplored depths. The observation that the temperature for a certain depth at a location is lower than the average temperature for the geographical area is used as the basis for predicting that oil or gas deposits are present beneath the measured depth at the location. Likewise, a higher than average temperature at a location is indicative that no oil or gas deposits are present.

A location is a place where a well is or may be drilled. The geographical area in which the location is situated may vary in size. Basically, the geographical area should have generally similar geological structure to the geological structure found at the location in question, and the geographical area should encompass at least as many locations where oil or gas deposits do not exist as locations where such deposits do exist. Average temperatures at measured depths for the geographical area should represent an average of temperatures for locations where oil and gas deposits both do and do not exist.

Using techniques and equipment commonly available, the temperature at a selected depth in a well may readily be measured. For example, a Kessler maximum reading thermometer contained within a carrier may be loaded on a wireline into a well. After allowing the thermometer to register an accurate temperature, the thermometer is retrieved. The temperature is read directly from the thermometer and the depth is calculated from the measured length of wireline cable lowered into the well. This technique can be repeated to obtain temperatures at a plurality of depths in a given well.

Temperatures at various bottom-hole depths in many geographical areas may be obtained from the data recorded for use with logs of the wells in the areas. This temperature vs. depth data may readily be used to establish average temperature values for geographical areas.

The following examples are provided by way of demonstration only and are not intended to limit the scope of the present invention which is defined in the appended claims.

EXAMPLE 1

In this example, the methods of the present invention were used to predict whether oil or gas deposits were likely to be found by a well located in McMullen County, Tex. The location selected for study in this Example 1 was: H. R. Smith, South Texas Syndicate Well No. 1, McMullen County, Tex. The accuracy of the predictions were verified by referring to the completion history of the well. According to the method of the present invention, the geographical area selected was McMullen County, Tex. Temperatures at various depths were obtained from the well log records of a number of wildcat wells drilled in McMullen County. The well log records were obtained from the Texas Railroad Commission. A sight-average of the temperature vs. depth values indicated that the average surface temperature ($T_s$) was about 80° F. and the average geothermal gradient ($G_r$) for McMullen County was about 1.5° F./100 ft. From this information, the average temperature ($T_r$) at any selected depth (D) was estimated by equation (1):

$$T_r = T_s + G_r D \tag{1}$$

For this location several actual temperatures ($T_a$) were measured at known depths. These temperatures ($T_a$) and the depths are recorded in Table I below. For each known depth, the estimated average temperature ($T_r$) was calculated using equation 1. These values of ($T_r$) are recorded in Table I.

From the values of ($T_a$) and ($T_r$) for each depth, the temperature difference ($\Delta T$) was calculated by equation (2), following:

$$\Delta T = T_a - T_r \tag{2}$$

and the values of $\Delta T$ are recorded in Table I.

TABLE I

| | H. R. Smith, South Texas Syndicate Well No. 1 McMullen County, Texas | | | | | |
|---|---|---|---|---|---|---|
| Depth (ft) | $T_a$ (°F.) | $T_r$ (°F.) | $\Delta T$ (°F.) | $G_a$ (°F./100 ft) | $G_r$ (°F./100 ft) | $\Delta G$ (°F./100 ft) |
| 6182 | 148 | 173 | −25 | 1.1 | 1.5 | −0.4 |
| 9016 | 179 | 215 | −36 | 1.1 | 1.5 | −0.4 |
| 10655 | 222 | 240 | −18 | 1.3 | 1.5 | −0.2 |
| 10658–82 | well produced 1,506 MCFD* on 5/32 choke | | | | | |
| 10915 | 244 | 244 | 0 | 1.5 | 1.5 | 0 |

*MCFD is "thousand of cubic feet of gas per day."

For each depth where an actual temperature ($T_a$) was obtained, a geothermal gradient ($G_a$) was obtained by equation (3):

$$G_a = (T_a - T_s)/D \tag{3}$$

The calculated values for ($G_a$) are recorded in Table I along with the average geothermal gradient ($G_r$).

From the values of ($G_a$) and ($G_r$) at each depth, the difference in the geothermal gradient ($\Delta G$) was calculated by equation (4):

$$\Delta G = G_a - G_r \tag{4}$$

and the values of $\Delta G$ are recorded in Table I.

Considering now Table I. At the depth of 6,182 ft., where the first temperature ($T_a$) was measured, ($\Delta T$) has a value of −25° F. and ($\Delta G$) has a value of −0.4. Both ($\Delta T$) and ($\Delta G$) are negative. According to the present invention, negative values of ($\Delta T$) and ($\Delta G$) indicate that oil and gas deposits are present at depths below 6,182 ft. At depths of 9,016 ft. and 10,655 ft., the values of ($\Delta T$) and ($\Delta G$) remain negative, indicating that the oil or gas deposit is deeper yet.

At 10915 ft., which is below the gas deposit, the values of ($\Delta T$) and ($\Delta G$) are both zero. According to the method of the present invention, an oil or gas deposit is not likely to be encountered below 10,915 ft. Accordingly, the oil or gas deposit is predicted to be between 10,655 ft. and 10,915 ft. In fact, the gas deposit was found in the interval of 10,658–82 ft.

At 10,658–82 ft., a gas deposit was struck in this well. The completed well flowed 1,506 MCFD of natural gas. Thus, the prediction using the method of the present invention was verified.

Returning now to the values of ($\Delta T$) as shown in Table I.

$\Delta T$ at 6,182 ft. is −25° F.
$\Delta T$ at 9,016 ft. is −36° F.
$\Delta T$ at 10,655 ft. is −18° F.
$\Delta T$ at 10,915 ft. is 0.

Generally, the magnitude of the negative value of $\Delta T$ increases as one approaches closer and closer to the oil or gas deposit. For example, ($\Delta T$) goes from −25° F. to −36° F. in the interval between 6,182 ft. and 9,016 ft., as the gas deposit is being approached. After the oil or gas deposit is passed, the magnitude of the negative value of ($\Delta T$) decreases, or actually becomes positive. In this example, the value of ($\Delta T$) at 10,915 ft. is zero, indicating that the gas deposit had been passed. These values of ($\Delta T$) all conform to the discovery of the present invention.

The value of ($\Delta T$) at 10,655 ft., however, does not conform to the present invention. This value of ($\Delta T$) is −18° F. which is still negative, but which is smaller than the values of ($\Delta T$) at shallower depths. This value of ($\Delta T$) at 10,655 ft. should have been, according to the present invention, greater than −36° F., if the oil or gas deposit began below 10,655 ft. The well was completed at 10,658 ft., only 3 ft. below the measurement at 10,655 ft. and the decrease in magnitude of ($\Delta T$) at 10,655 ft. indicates that the gas deposit had already been entered.

EXAMPLE II

The methods of the present invention, as described in Example I, were repeated and applied to two additional wells in McMullen County, Tex. As in Example I, the value of ($T_s$) was taken to be about 80° F. and the value of ($G_r$) to be about 1.5° F./100 ft. For each of the two wells studied in this example, actual temperatures ($T_a$) at measured depths were obtained from well log records for these wells. The values of ($T_r$), ($G_a$), ($\Delta T$) and ($\Delta G$) for each measured depth were obtained using, respectively, equations (1), (3), (2) and (4) above.

Compilations of data for each of the wells of this example are shown respectively in Table II and Table III following.

TABLE II

| | Argo Oil Corp., American National Ins. Well No. 1 McMullen County, Texas | | | | | |
|---|---|---|---|---|---|---|
| Depth (ft) | $T_a$ (°F.) | $T_r$ (°F.) | $\Delta T$ (°F.) | $G_a$ (°F./100 ft) | $G_r$ (°F./100 ft) | $\Delta G$ (°F./100 ft) |
| 7641 | 180 | 194 | −14 | 1.3 | 1.5 | −0.2 |
| 7850–64 | well produced 1,124 MCFD through 10/64 choke | | | | | |
| 8201 | 196 | 203 | −7 | 1.4 | 1.5 | −0.1 |
| 8693 | 220 | 210 | +10 | 1.6 | 1.5 | +0.1 |
| 9383 | 225 | 220 | +5 | 1.54 | 1.5 | +0.04 |

Considering now the data in Table II. At the depth of 7,641 ft., (ΔT) has a value of −14° F. and (ΔG) has a value of −0.2. Both (ΔT) and (ΔG) are negative, indicating by the present invention, the presence of an oil or gas deposit at a depth below 7,641 ft. In fact, a gas deposit was found in the interval 7,850–64 ft., some two hundred feet below this depth.

At the depths of 8,693 ft. and 9383 ft., both (ΔT) and (ΔG) have positive values, indicating by the present invention, that the oil or gas deposit had been passed.

Further, in Table II, at the depth of 8,201 ft., the value of (ΔT) is −7° F. and of (ΔG) is −0.1° F./100 ft. Both (ΔT) and (ΔG) are negative, indicating by the present invention that an oil or gas deposit should be found below 8,201 ft. and above 8,693 ft. where the values of (ΔT) and (ΔG) were found to be positive. No commercial oil or gas deposit was found in this interval.

The magnitude of (ΔT) at 8,201 ft. is small, only −7° F. This value of (ΔT) is entering the uncertain area around the (ΔT) value of zero. With these uncertain values, interpreting the data according to the method of the present invention is difficult. Even small errors in the measurements of the temperatures ($T_a$) or in measurements of the depths will confuse interpretation of the data. Additionally, a small, noncommerical oil or gas deposit could be present which would account for a (ΔT) of small negative magnitude.

TABLE III

| Rutherford Oil Corp., Earl Baker Well No. 3A McMullen County, Texas | | | | | | |
|---|---|---|---|---|---|---|
| Depth (ft) | $T_a$ (°F.) | $T_r$ (°F.) | T (°F.) | $G_a$ (°F./100 ft) | $G_r$ (°F./100 ft) | ΔG (°F./100 ft) |
| 1525 | 110 | 102 | +8 | 1.96 | 1.5 | +0.46 |
| 7672 | 182 | 193 | −11 | 1.33 | 1.5 | −0.17 |
| 8000–20 | | | well produced 2,066 MCFD | | | |
| 9300 | 239 | 220 | +19 | 1.6 | 1.5 | +0.1 |

Considering now the data in Table III. At the depth of 7,672 ft., (ΔT) has a value of −11° F. and (ΔG) has a value of −0.17° F./100 ft. Both (ΔT) and (ΔG) are negative, indicating by the present invention, the presence of an oil or gas deposit at a depth below 7,672 ft. At 9,300 ft., the values of both (ΔT) and (ΔG) are positive, indicating that the oil or gas deposit had been passed. The completion history of this well shows that a gas deposit was found at the interval 8,000–20 ft., which is between 7,672 ft. and 9,300 ft. The prediction of the presence of an oil or gas deposit by the method of the present invention is verified.

Note in Table III at the depth of 1,525 ft., the value of (ΔT) is positive as +8° F. This alone would indicate that no oil or gas deposit would be found at a lower depth. However, comparing the measured temperature ($T_a$) of 110° F. with the temperature ($T_r$) of 102° F., which is about the average for that depth in the County, shows that the value of ($T_a$) is much too high for such a shallow depth. It appears that the measured value of 110° F. for ($T_a$) at 1,525 ft. is incorrect or the gradient used in the calculations must be modified for the shallow depth range. This demonstrates the effect that inaccurate data can have on the practice of this invention.

EXAMPLE III

In this Example, another embodiment of the present invention is demonstrated. According to this method, the presence of an oil or gas deposit is predicted by comparing the values of the geothermal gradient over succeeding depth intervals in a well. When the value of the geothermal gradient decreases in value from one interval to the next succeeding interval, the method of the present invention predicts that it is likely that an oil or gas deposit will be found at a lower depth. The corollary to this prediction is, when the value of the geothermal gradient increases from one interval to the next succeeding interval, it is not likely that an oil or gas deposit will be found at a lower depth. The geothermal gradient is, of course, an expression of the change in temperature with a change in depth and commonly has units of °F./100 ft. The geothermal gradient (G) across a depth interval is calculated by equation (5):

$$G = (T_r - T_l)/(D_r - D_l) \tag{5}$$

wherein $T_l$ is the temperature at depth $D_l$ which is the top of the interval; and $T_r$ is the temperature at depth $D_r$ which is the bottom of the interval.

To demonstrate this method, a series of temperatures were obtained at known depths for a particular well. From this temperature and depth data, values of geothermal gradient (G) were calculated over depth intervals in the well from the surface to the bottom. Employing the method of the present invention, a prediction was made of whether an oil or gas deposit would be found in the well. The accuracy of the prediction was verified by comparing the prediction with the completion history of the well.

The well chosen for this example was Atlantic Richfield, J. M. Morin No. 1., Hidalgo County, Tex. Measured temperatures and depths for this well are shown in Table IV. The geothermal gradient over each depth interval was calculated using equation (5) and is recorded in Table IV.

TABLE IV

| Atlantic Richfield, J. M. Morin No. 1 Hidalgo Co., Texas | | |
|---|---|---|
| Depth (ft) | Temp. (°F.) | Geothermal Gradient (°F./100 ft) |
| surface | 73 | 1.39 |
| 3012 | 115 | 1.43 |
| 8244 | 190 | 0.80 |
| 9247 | 198 | |
| 9810–38 | productive zone | 2.46 |
| 11198 | 246 | |

Considering now Table IV, the geothermal gradient over the interval from the surface to 3,012 ft. is 1.39° F./100 ft., and is about the same as the geothermal gradient (1.43° F/100 ft.) over the next succeeding interval from 3,012 ft. to 8,244 ft. In the third depth interval, from 8,244 ft. to 9,247 ft., the value of the geothermal gradient dropped precipitously to 0.80° F/100 ft. According to the present invention, this sharp drop in value of the geothermal gradient from 1.43 to 0.798 is indicative that an oil or gas deposit occurs at a depth below 9,247 ft.

The geothermal gradient across the interval 9,247 ft. to 11,198 ft. is very high at 2.46° F./100 ft. This large value for the geothermal gradient indicates it is likely that an oil or gas deposit is present in the interval between 9,247 ft. and 11,198 ft. However, large geothermal gradients may also indicate the presence of other hydrocarbons such as lignite or coal.

The production history of this well shows that it was completed at a depth of 9,810–38 ft. and flowed 551 MCFD of natural gas and eight barrels of condensate per day. This verifies the prediction using the method of the present invention that an oil or gas deposit was likely to be present below a depth of 9,247 ft.

From the foregoing, it can be seen that the methods of the present invention are effective for predicting whether oil or gas deposits are likely to be found below locations where such methods are applied. Modifications and variations of the methods of the present invention will occur to those skilled in the art. Such modifications and variations which are within the spirit of the present invention are intended to be included within the scope of the appended claims.

What is claimed is:

1. A method for predicting the likelihood of encountering an oil or gas deposit below a location, which method comprises:
   determining a temperature ($T_a$) at a first known depth beneath the location;
   determining a temperature ($T_r$) representative of the average temperature for said first known depth within a geographical area within which the location is situated; and
   determining a temperature difference ($\Delta T$) according to the relationship $\Delta T = T_a - T_r$ wherein for ($\Delta T$) of negative value it is likely that an oil or gas deposit is present at said location at a depth beneath said first known depth, and wherein for ($\Delta T$) of zero or positive value it is likely that no oil or gas deposit is present at said location at a depth beneath the first known depth.

2. The method of claim 1 including:
   determining a temperature ($T_a'$) at a second known depth beneath said location, wherein said second depth is below said first depth;
   determining a temperature ($T_r'$) representative of the average temperature for the second depth within a geographical area within which the location is situated; and
   determining a temperature difference ($\Delta T'$) according to the relationship $\Delta T' = T_a' - T_r'$,
   wherein for $\Delta T$ and $\Delta T'$ both of negative value and $\Delta T'$ of greater magnitude than $\Delta T$, it is likely than an oil or gas deposit is present below said second depth,
   wherein for $\Delta T$ and $\Delta T'$ both of negative value and $\Delta T'$ of lesser magnitude than $\Delta T$, it is likely that a first oil or gas deposit is present between said first and second depths and likely that a second oil or gas deposit is present below said second depth, and
   wherein for $\Delta T$ of negative value and $\Delta T'$ of zero or positive value, predicting that an oil or gas deposit is present between said first and second depths, and that no oil or gas deposit is below said second depth.

3. The method of claim 2 wherein the method is repeated for a plurality of sets of first and second known depths at the same location.

4. The method of claim 3 wherein the second known depth of one set of first and second known depths is the first known depth of the next succeeding set of first and second known depths.

5. The method of claim 4 wherein the temperature $T_a$ for each known depth is determined during the course of drilling a borehole at said location.

6. The method of claim 1 wherein said first depth is the bottom hole depth of a borehole previously drilled at the location, and the temperature $T_a$ is the bottom hole temperature of said borehole.

7. The method of claim 2 wherein said second depth is the bottomhole depth of a borehole previously drilled at the location and wherein the temperature $T_a'$ is the bottomhole temperature of said borehole, and wherein said first depth is an intermediate depth in said borehole and said temperature $T_a$ is the temperature at said intermediate depth in said borehole.

8. The method of claim 4 wherein for the lowest set of first and second depths the second depth is the bottom hole depth of a previously drilled borehole and all other known depths are intermediate depths in the borehole and all temperatures $T_a$ are borehole temperatures.

9. The method of claim 1 wherein the geographical area contains a plurality of locations, and wherein the temperature $T_r$ for any known depth is the average of the temperatures $T_a$ for said known depth from the plurality of locations.

10. The method of claim 9 wherein said method is applied to each location in turn.

11. The method of claim 1 wherein the known depth is about the surface of the earth.

12. The method of claim 1 wherein the known depth is the surface, wherein the temperature ($T_a$) is the mean annual atmospheric temperature for the location and wherein the temperature ($T_r$) is the mean annual atmospheric temperature for the geographical area.

13. The method of claim 1 wherein the known depth is at the ocean bottom, wherein the temperature ($T_a$) is the benthic temperature near the ocean bottom at said location, and wherein ($T_r$) is the average benthic temperature at the ocean bottom at the known depth within the geographical area.

14. A method for predicting the likelihood of encountering an oil or gas deposit below a location, which method comprises:
   determining the geothermal gradient ($G_a$) across a first interval from the surface to a first known depth at said location;
   determining a geothermal gradient ($G_r$) representative of the average geothermal gradient for the geographical area within which the location is situated; and
   determining a geothermal gradient difference ($\Delta G$) according to the relationship $\Delta G = G_a - G_r$, wherein for $\Delta G$ of negative value it is likely that an oil or gas deposit is present at said location below said first known depth interval and wherein for ($\Delta G$) of positive value it is likely that no oil or gas deposit is present below said first interval.

15. The method of claim 14, further comprising:
   determining a geothermal gradient ($G_a'$) at said location across a second interval from the surface to a second known depth, wherein said second depth is below said first depth; and
   determining a geothermal gradient difference ($\Delta G'$) according to the relationship $\Delta G' = G_a' - G_r$,
   wherein for $\Delta G$ and $\Delta G'$ both of negative value and wherein the magnitude of $\Delta G'$ is greater than the magnitude of $\Delta G$, it is likely that an oil or gas deposit is present below said second known depth,
   wherein for $\Delta G$ and $\Delta G'$ both of negative value and wherein $\Delta G$ is of greater magnitude than $\Delta G'$, it is likely that a first oil or gas deposit is present between said first and second known depths, and it is likely that a second oil or gas deposit is present below said second known depth,
   wherein for $\Delta G$ of positive value and $\Delta G'$ of negative value it is likely that a first oil or gas deposit is present above said first known depth and a second oil or gas deposit is present below said second known depth, wherein for $\Delta G$ of negative value and $\Delta G'$ of positive value it is likely an oil or gas deposit is present between said first and second known depth and likely that no oil or gas deposit is present below said second known depth.

16. The method of claim 15 applied to a plurality of intervals from the surface to a plurality of known depths.

17. A method for predicting the likelihood of encountering oil or gas deposits below a location, which method comprises:

determining a first geothermal gradient $G_1$ across a first depth interval beneath said location;

determining a second geothermal gradient $G_2$ across a second depth interval below said first interval; and comparing the values of $G_1$ and $G_2$, wherein for $G_1$ of greater value than $G_2$ it is likely than an oil or gas deposit is present below said second interval.

18. The method of claim 17, further comprising:

determining a third geothermal gradient ($G_3$) across a third depth interval below said second interval; and comparing the values of $G_1$, $G_2$ and $G_3$, wherein for $G_1$ greater than $G_2$ greater than $G_3$, it is likely an oil or gas deposit is present below said third depth interval, wherein for $G_1$ less than $G_2$ and $G_2$ greater than $G_3$, it is likely an oil or gas deposit is present within said second interval, wherein for $G_1$ greater than $G_2$ and $G_2$ less than $G_3$ it is likely an oil or gas deposit is present in said third interval, and wherein for $G_1$ less than $G_2$ and $G_2$ less than $G_3$ it is likely that an oil or gas deposit is not present below said third interval.

19. The method of claim 18 wherein the geothermal gradients are obtained in the process of drilling a borehole.

20. The method of claim 18 wherein a geothermal gradient is obtained for a plurality of intervals within a borehole, wherein the geothermal gradient $G_3$ becomes the geothermal gradient $G_1$ of succeeding predictions.

* * * * *